United States Patent
Schultz

[11] 3,826,560
[45] July 30, 1974

[54] METHOD OF FORMING A LIGHT FOCUSING FIBER WAVEGUIDE

[75] Inventor: Peter C. Schultz, Painted Post, N.Y.

[73] Assignee: Corning Glass Works, Corning, N.Y.

[22] Filed: Mar. 30, 1972

[21] Appl. No.: 239,496

[52] U.S. Cl............ 350/96 WG, 65/3, 65/4, 65/18, 65/30, 65/32, 65/33, 65/120, 65/121
[51] Int. Cl.... G02b 5/14, C03b 23/20, C03b 25/00
[58] Field of Search......... 65/32, 33, 30, 4, 3, 18, 65/121, 120; 350/96 WG, 175 GN

[56] References Cited
UNITED STATES PATENTS

| | | | |
|---|---|---|---|
| 2,967,113 | 1/1961 | Liebhafsky et al. | 65/32 X |
| 3,271,179 | 9/1966 | Smith, Jr. | 65/DIG. 7 |
| 3,294,504 | 12/1966 | Hicks, Jr. | 65/4 X |
| 3,614,197 | 10/1971 | Nishizawa | 65/DIG. 7 |
| 3,659,915 | 5/1972 | Maurer et al. | 65/DIG. 7 |

Primary Examiner—Frank W. Miga
Attorney, Agent, or Firm—Walter S. Zebrowski; Clarence R. Patty, Jr.

[57] ABSTRACT

A method of forming an article such as a light focusing fiber waveguide by applying to a substantially cylindrical starting member a layer of soot having a radially varying composition by means of flame hydrolysis. The starting member is removed and the resulting substantially cylindrical hollow cylinder is heated and drawn to reduce the cross-sectional area and to collapse the hole to form a fiber having a solid cross-sectional area with a radially varying composition.

20 Claims, 9 Drawing Figures

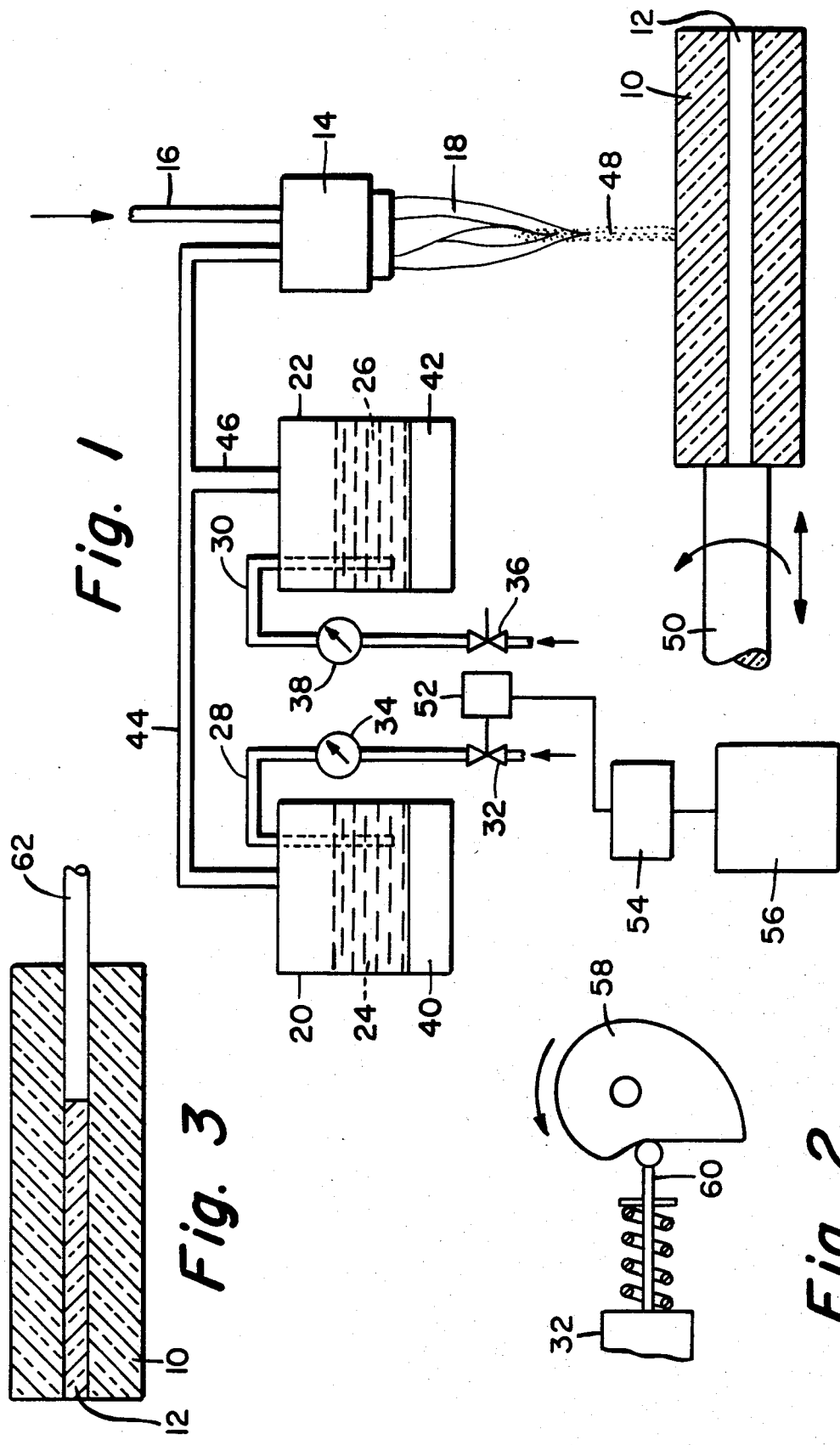

METHOD OF FORMING A LIGHT FOCUSING FIBER WAVEGUIDE

BACKGROUND OF THE INVENTION

1. Field of the Invention

A transverse-gradient cylindrical article is here defined to be a cylinder of transparent dielectric material, such as glass or plastic, possessing a substantially axially symmetrical but radially varying composition and consequently radially varying refractive index. The diameter of the article is large enough so that a beam of light undulating about the axis does not strike the lens-atmosphere interface.

Operational theories and other pertinent information concerning lenses and optical waveguides may be found in "Geometrical Optics of Parabolic Index-Gradient Cylindrical Lenses" by F. P. Kapron, Journal of the Optical Society of America, Vol. 60, No. 11, pages 1433–1436, November 1970; U.S. Pat. No. 3,157,726 issued to Hicks et al.; in the publication entitled "Cylindrical Dielectric Waveguide Mode" by E. Snitzer, Journal of the Optical Society of America, Vol. 51, No. 5, pages 491–498, May 1961; and in "Fiber Optics Principles and Applications" by N. S. Kapany, Academic Press, 1967.

2. Description of the Prior Art

A method heretofore used for producing light focusing waveguides has been employed by the Nippon Selfoc Company, Ltd. for the production of glass fiber waveguides under the tradename "Selfoc." Such waveguides have been produced primarily by drawing fibers from a conventional glass melt and then subsequently subjecting the fibers to an ion exchange process to develop the desired gradient refractive index. There are many problems with such waveguides, one of the primary ones being high attenuation resulting from the inherent impurity level in the glass. Other difficulties are getting a sufficient depth of ion exchange and controlling refractive index gradient.

SUMMARY OF THE INVENTION

It is an object of the present invention to provide an article having a varying composition and more particularly a method for economically producing a light focusing fiber waveguide which overcomes the heretofore noted disadvantages.

Other objects of the present invention are to provide a method for forming a light focusing fiber waveguide which reduces the level of impurities present in the material and which reduces attenuation so as to permit utility of the waveguide for long distance applications.

Broadly, according to this invention, an article having a varying or gradient chemical composition is produced by first providing a substantially cylindrical starting member and rotating the member about its longitudinal axis. A plurality of constituents in vapor form are entrained in a gaseous medium in predetermined amounts and thereafter are hydrolyzed in a flame to form a soot having a predetermined composition. The soot is applied to the exterior peripheral surface of the starting member. The amount of vapor entrained in the gaseous medium of at least one of the constituents is varied in a predetermined desired manner so that a layer of soot is built up on the member having a radially varying composition. Thereafter, the starting rod or member is removed. The soot may be sintered as deposited if the temperature is high enough, or it may thereafter be sintered in a subsequent operation. The resulting cylindrical hollow member may be either maintained at or heated to a temperature at which the material has a low enough viscosity for drawing and drawn to reduce the diameter thereof until the inner walls of the hollow member collapse, that is the longitudinal hole is sealed and a solid rod is formed. Thereafter, if desired, continued drawing of the member further reduces the diameter thereof to form an article, such as a light focusing fiber waveguide.

These and additional objects, features and advantages of the present invention will become apparent to those skilled in the art from the following detailed description and the attached drawings on which, by way of example, only the preferred embodiments of this invention are illustrated.

BRIEF DESCRIPTION OF THE DRAWINGS

FIG. 1 is a diagrammatic illustration of means for applying to a starting member a layer of soot having a radially varying composition.

FIG. 2 is an illustration of a means for varying gas flow through a valve.

FIG. 3 is a fragmentary cross sectional elevation illustrating a means of removing the starting member.

DETAILED DESCRIPTION OF THE INVENTION

Figure 4:
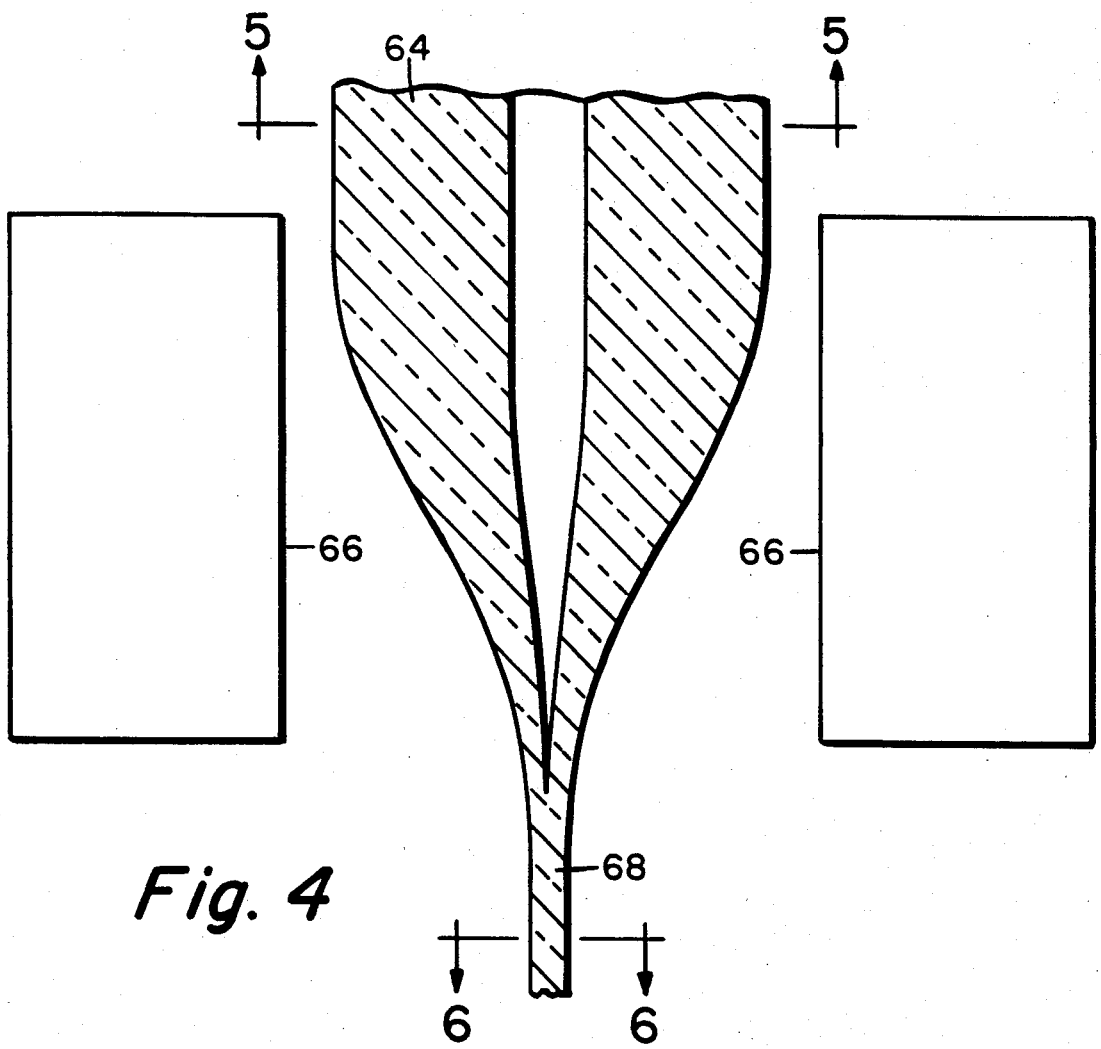
FIG. 4 is a fragmentary elevation partly in cross section of an optical fiber being formed.

It is to be noted that the drawings are illustrative and symbolic of the present invention and there is no intention to indicate the scale or relative proportions of the elements shown therein. For the purposes of simplicity, the present invention will be described in connection with the formation of a light focusing fiber waveguide although this invention is not intended to be limited thereto.

Referring to FIG. 1, a layer 10 of glass is applied to a substantially cylindrical glass starting member or rod 12 by means of flame hydrolysis burner 14. Fuel gas and oxygen or air are supplied to burner 14 from a source not shown by a suitable means such as pipe 16. This mixture is burned to produce flame 18 which is emitted from the burner.

Containers 20 and 22 hold quantities of liquid constituents 24 and 26 respectively which will ultimately form layer 10. A suitable gaseous medium, such as oxygen or the like, is supplied to the containers and bubbled through the liquids by means of tubes 28 and 30. The gaseous medium or carrier gas is supplied from a suitable source, not shown, in predetermined quantities and at predetermined pressures. The flow of carrier gas which is bubbled through liquid constituent 24 in container 20 is regulated by valve 32, the flow rate of this carrier gas being indicated by gauge 34. Similarly, the flow of carrier gas bubbled through liquid constituent 26 in container 22 is regulated by valve 36 with the flow rate of this gas being indicated by gauge 38.

The liquid constituents in containers 20 and 22 are maintained at the desired temperatures by heaters 40 and 42 respectively. As the carrier gas is bubbled through heated liquid constituent 24 in container 20, vapors of this liquid become entrained in the carrier gas and are exhausted by means of tube or pipe 44. Similarly, vapors of liquid constituent 26 in container 22 become entrained in the carrier gas being bubbled through that liquid and are exhausted from the container by means of pipe 46 to intermix with the carrier gas-vapor mixture from container 20. This carrier gas-vapor mixture is fed to flame hydrolysis burner 14 and is injected into flame 18 wherein the gas-vapor mixture is hydrolyzed to form a glass soot. The soot leaves flame 18 in a stream 48 and is directed toward starting member 12. Starting member 12 is both rotated and translated as indicated by the arrows adjacent supporting end 50 of starting member 12 so that a uniform deposition of soot is applied to the starting member. Of course, it will be understood that a plurality of burners 14, in a row or radially displaced, can be provided adjacent starting member 12 so that a longitudinally uniform soot layer can be produced without the need for translating starting member 12. In such an embodiment, starting member 12 would only have to be rotated.

If a soot formed of more than two constituents is desired, it may be formed by the method of the present invention by providing as many containers for such constituents as required in the manner hereinabove described. Also, it may be possible in certain circumstances to form a mixture of constituents in one container while other constituents are in separate containers.

As will be understood, by controlling the temperature of the liquid constituents which have known vapor pressures and controlling the flow rates and pressures of each of the carrier gases, precise quantities of the vapors of the liquid constituents can be entrained in the carrier gases and subsequently hydrolyzed. By carefully controlling these amounts of vapors, the resulting composition of the soot emitted from the flame of the burner can be carefully controlled. In accordance with the present invention, an article having a radially varying composition can be produced by varying the flow rate of the carrier gas to at least one of the containers of liquid constituents in a predetermined manner so as to obtain a desired, radially gradient composition deposited on starting member 12.

One means for suitably controlling the amount of carrier gas supplied to container 20 is to have valve 32 be a motorized valve. Such a system would additionally have a valve motor 52, signal converter 54 and a controller 56. A suitable controller for this purpose may be a Model 5300 Data-Trak Programmer manufactured by R-I Controls, a division of Research Inc. of Minneapolis, Minnesota. The manner in which it is desired to vary the carrier gas flow to container 20 is programmed into controller 56 which provides a corresponding signal to signal converter 54. Converter 54 in turn correspondingly drives valve motor 52 which controls the amount of carrier gas flowing through valve 32.

Another means for suitably controlling the amount of carrier gas supplied to container 20, may be accomplished by having the gas flow through valve 32 controlled by cam 58 as additionally illustrated in FIG. 2. Cam 58 may be operated in a predetermined desired manner by suitable electrical, mechanical or electromechanical control means well known in the art. The peripheral surface of cam 58 is disposed against valve stem 60 so that as the cam rotates, the displacement of stem 60 is varied. By suitably forming the peripheral surface of cam 58 and rotating it at a predetermined desired rate, the amount of carrier gas flowing through valve 32 at any given time can be carefully controlled.

Any other means for controlling fluid flow known in the art is similarly suitable for the present purposes and the above examples are merely shown as illustrative.

Similarly, the rotation and, if necessary, translation of starting member 12 must be controlled. It is understood that any electrical, mechanical, or electromechanical means known in the art for the control of translation and rotation of moving members may be used and such means do not form any part of the present invention except as is necessary to have such means for obtaining such movement. An example of means for providing rotation and translation is a typical lathe device.

As will be understood, soot from a flame hydrolysis burner is built up on a starting member in a plurality of successive films. If a plurality of burners are employed, as heretofore described, so that the member does not have to be translated, a complete film of soot is applied for each rotation of the starting member. When translation is required, a plurality of rotations are needed to apply one complete film. It will be understood that the amount of soot per unit time deposited from a flame hydrolysis member is relatively low. Therefore, by causing the starting member to be rotated and translated at a reasonably high velocity, such for example as 200 revolutions per minute and 20 inches per minute respectively, a complete film of soot having substantially the same composition can be applied to the entire soot depositing surface even though the composition is continually varied as by a cam operated valve. That is, the composition is varied slowly while a film of soot can be applied rapidly.

The material of layer 10 should be formed from a glass having a minimum light absorption characteristic, and although any optical quality glass may be used, a particularly suitable base glass from which to make a light focusing fiber waveguide is fused silica. Since such a waveguide must have a radially gradient index of refraction, it must therefore have a radially varying composition. Accordingly, fused silica doped with a varying quantity of material to change the index of refraction may be used.

There are many suitable materials that can satisfactorily be used as a dopant alone or in combination with each other. These include, but are not limited to, titanium oxide, tantalum oxide, tin oxide, niobium oxide, zirconium oxide, aluminum oxide, lanthanum oxide, and germanium oxide. The maximum amount of dopant used should be kept to a minimum for at least the reason that an excessive amount of doping material will result in a loss of light transmission. Desirably, the maximum amount of dopant to be added is the minimum amount which will yield the desired variable index of refraction of the glass. For the purpose of the light focusing fiber waveguide of the present invention, the maximum amount of dopant at any point of the article is preferably maintained below about 25 percent by weight of the total composition at that point.

A particularly effective method of forming or applying layer 10 is accomplished by a flame hydrolysis process similar to that described in U.S. Pat. No. 2,272,342 issued to J. F. Hyde or U.S. Pat. No. 2,326,059 issued to M. E. Nordberg. A modification of the Nordberg process will provide a fused silica layer doped with radially varying amounts of titanium oxide is described hereinafter.

The thickness of layer 10 is determined by the amount of soot deposited which is primarily controlled by the flow rate and the time allowed for deposition. To provide a dense, uniform coating, the soot applied may be sintered as deposited if the temperature is high enough, or it may thereafter be sintered in a subsequent operation. Sintering reduces the thickness of layer 10 due to the consolidation of the particles.

Referring to FIG. 3, the removal of starting member 12 is illustrated. Starting member 12 is shown being ground out by means of a diamond reamer 62, however, any other means for accomplishing this result is suitable, such for example as hydrofluoric acid etching, core drilling, or the like.

Since glass starting member 12 is ultimately removed, the material of member 12 need only be such as to have a composition and coefficient of expansion compatible with the material of layer 10. A suitable material may be normally produced glass having a composition similar to that of layer 10 although it does not need the high purity thereof. It may be normally produced glass having ordinarily or even an excessive level of impurity or entrapped bubbles that would otherwise render it unsuitable for effective light propagation. The starting member may also be formed of graphite or the like.

Figure 5:
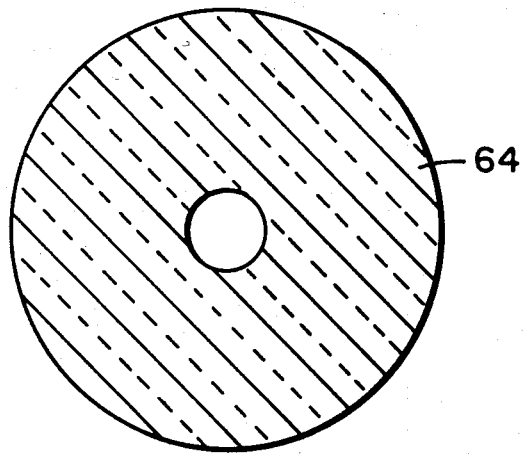
FIG. 5 is a cross section taken along line 5—5 of FIG. 4.
Figure 6:
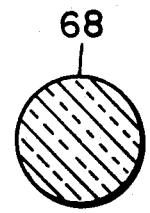
FIG. 6 is a cross section taken along line 6—6 of FIG. 4.

After structure 64 is formed by removing the starting member, it is either maintained at the desired temperature or heated to the desired temperature by furnace 66 as illustrated in FIG. 4. After the structure reaches a temperature at which the material has a low enough viscosity for drawing, it is drawn until the cross sectional size thereof is reduced sufficiently to produce fiber 68. Such a fiber thereafter forms the light focusing fiber waveguide. In FIG. 5, there is illustrated the cross sectional view of structure 64 before it is drawn, while FIG. 6 illustrates the cross section of fiber 68 drawn to the desired cross sectional dimensions. It is to be understood that both multimode and single mode light focusing fiber waveguides may be formed by the present method.

Figure 7:
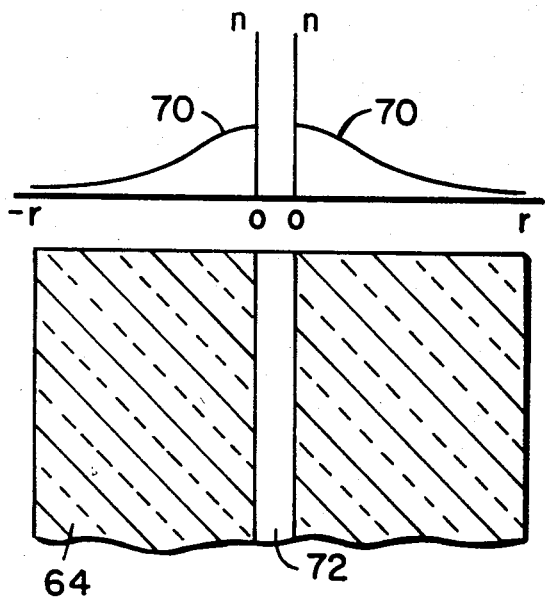
FIG. 7 is an illustration of the radially varying composition of the structure of the present invention after the starting member has been removed.

Referring to FIG. 7, there is illustrated, partly by graph, structure 64 having a radially varying composition which produces a radially varying index of refraction illustrated by curve 70. Curve 70 is illustrated in two portions separated by hole 72.

Figure 8:
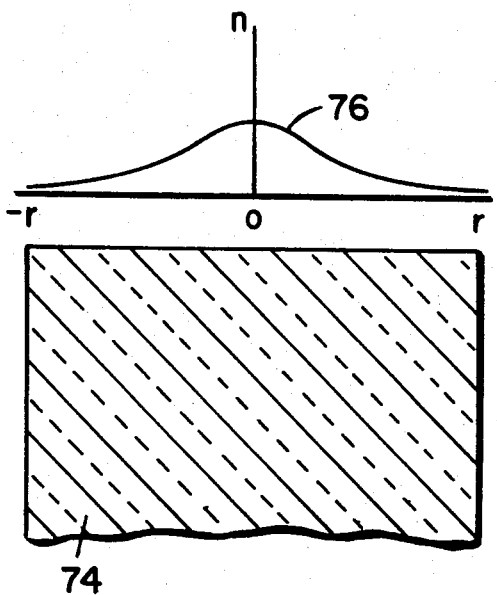
FIG. 8 is an illustration of the radially varying composition of an optical waveguide formed in accordance with the present invention.
Figure 9:
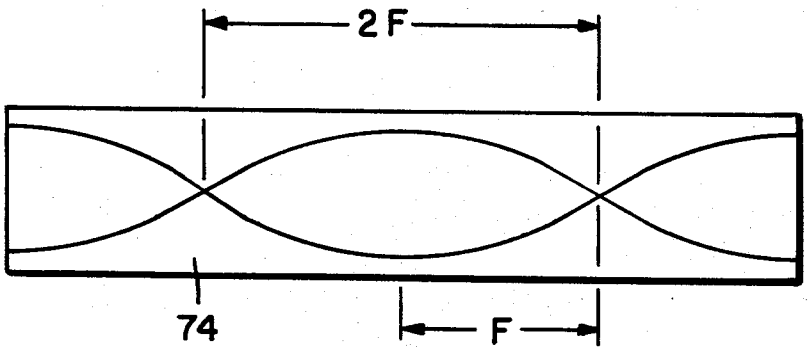
FIG. 9 is an illustration showing the focal length of a waveguide formed in accordance with the present invention.

An example of forming an article having a radially varying composition which is suitable for use as a light focusing fiber waveguide may have parameters defined by the equation $$n_r = n_o \operatorname{sech} \pi r/2F$$

where $n_r$ is the index of refraction at a point in the article having radius $r$, $n_o$ is the refractive index at the center of the article and $F$ is the focal length. The refractive index inside an article in the form of a right circular cylinder is a function of only the radius at that point. Light rays incident on the cylinder traveling parallel to the longitudinal axis thereof, will be brought to focus at a distance along the article equal to the focal length. An example of the means for determining and coordinating the values in the above equation may be as follows. If a doped fused silica light focusing fiber waveguide is to be formed having a 5 mil diameter, an index of refraction at the center $n_o$ of approximately 1.4662, and an index of refraction $n_r$ at the periphery of the waveguide of 1.4584 (the index of refraction of 1.4584 is generally accepted for pure fused silica for sodium light having a wavelength of $\lambda = 5893A$), then according to the above equation, the focal length $F$ of such a light focusing fiber waveguide would be 2.75 mm. This is illustrated, partly by graph, in FIG. 8 wherein a light focusing fiber waveguide 74 has a radially varying composition resulting in a radially varying index of refraction as illustrated by curve 76. The index of refraction illustrated by curve 76 is shown to vary in accordance with sech $\pi r/2F$. The focal length F of waveguide 74 is illustrated in FIG. 9.

Although structure 64 has a substantially larger diameter than fiber waveguide 74 which is formed from such structure, and although structure 64 has a central hole 72, the radially varying index of refraction of the fiber waveguide follows the same curve as does the structure. Therefore, curve 70 illustrated in FIG. 7 is substantially the same curve as curve 76 illustrated in FIG. 8 except that the high point of curve 70 is at both edges of central hole 72. As herein described, this hole is collapsed during subsequent drawing wherein the index of refraction about the periphery becomes the ultimate index of refraction at the central point of the fiber waveguide.

A specific example of a light focusing fiber waveguide produced by the method of the present invention is as follows. A starting member of fused quartz, approximately one-eighth inch in diameter and about 10 inches long is sealed to a suitable handle. Liquid $SiCl_4$ maintained at a temperature of 20°C. is provided in a first container and liquid $TiCl_4$ maintained at a temperature of 88°C. is provided in a second container. The vapor pressure of each of these liquids at the noted temperatures is 190 mm Hg. Dry oxygen is bubbled through both liquids so that vapors of each are picked up by the oxygen. Oxygen is initially bubbled through the liquid $SiCl_4$ at the rate of 5000 cc. per minute and through the liquid $TiCl_4$ at the rate of 118 cc. per minute. Under these conditions, the vapors entrained within the oxygen comprise 2.3 mole percent $TiCl_4$ and 97.7 mole percent $SiCl_4$. This ratio of vapors, when hydrolyzed within the flame of a flame hydrolysis burner provides a soot composition of 3 percent by weight $TiO_2$ and 97 percent by weight $SiO_2$ having an index of refraction of 1.4662 for light having a wavelength of 5893A. This soot is deposited as a layer onto the rotating and translating starting member. As the soot layer builds up, the flow of dry oxygen through the $TiCl_4$ liquid is slowly decreased to yield a soot layer of continually radially decreasing $TiO_2$ content. The reduction of the oxygen flow through the $TiCl_4$ liquid is accomplished by means of a cam operated regulator valve, the cam profile being selected to produce the desired ultimate composition gradient. In accordance with the above parameters, a composite structure 8 inches long by 2 inches in diameter and a radially varying composition may be produced in about 1 ½ hours. Thereafter, this layer of soot is sintered in an induction furnace having an oxygen atmosphere at about 1500°C. The fused quartz starting member is ground out by means of a diamond reamer either before or after the sintering step. The tubular member so formed, is rinsed in about 50 percent hydrofluoric acid solution, flame polished, and washed again in said acid solution to provide a clean tubular member having an approximate outside diameter of about 1 ¾ inches after sintering. The structure is then placed in an induction furnace and is drawn in an oxygen atmosphere at about 2000°C. As the structure is drawn, it decreases in diameter and the central hole collapses. Drawing is continued until the final desired waveguide dimensions are obtained. For a typical final waveguide outside diameter of 5 mils, the waveguide focal length for the above-described waveguide will be about 2.75 mm.

Ordinarily, the relationship between the composition variation and the variation of the index of refraction is substantially linear as in the specific example described hereinabove, however, this relationship may be different depending at least in part on the materials employed.

Although the present invention has been described with respect to specific details of certain embodiments thereof, it is not intended that such details be limitations upon the scope of the invention except insofar as set forth in the following claims.

I claim:

1. A method of forming an article having a continually varying or gradient chemical composition comprising the steps of
   providing a substantially cylindrical starting member,
   rotating said member about the longitudinal axis thereof,
   entraining in a gaseous medium predetermined amounts of each of a plurality of constituents in vapor form,
   hydrolyzing said vapors in a flame to form a soot having a predetermined composition,
   applying said soot to the exterior peripheral surface of said member, and
   continually varying the amount of vapor entrained in said gaseous medium of at least one of said constituents in a predetermined desired manner, whereby one layer of said soot is built up on said member having a substantially continually radially varying composition.

2. The method of claim 1 wherein said article is a right circular cylinder.

3. The method of claim 2 wherein said article is transparent and the radially varying composition provides a radially varying index of refraction in accordance with the equation $$n_r = n_0 \text{ sech } \pi r/2F$$

where $n_0$ is the index of refraction at the center of said article, $n_r$ is the index of refraction at any point at a distance $r$ from the center of said article, and $F$ is the focal length of said article.

4. The method of claim 1 further comprising the steps of
   removing said starting member by drilling, mechanically polishing the drilled surface, and flame polishing the mechanically polished surface.

5. The method of claim 4 further comprising the step of hydrofluoric acid washing of said drilled surfaces following each polishing step.

6. The method of claim 1 wherein said soot is fused silica at least initially doped with at least one material selected from the group consisting of titanium oxide, tantalum oxide, tin oxide, niobium oxide, zirconium oxide, aluminum oxide, lanthanum oxide, and germanium oxide.

7. The method of claim 6 wherein said soot is doped with not more than 25 percent by weight titanium oxide at the center thereof.

8. The method of claim 1 further comprising the steps of removing said cylindrical starting member,
   heating the structure so formed to the drawing temperature of the materials thereof, and
   drawing the heated structure to reduce the cross-sectional area thereof and to collapse the hole resulting from removing said starting member to form a fiber having a solid cross-section.

9. The method of claim 1 further comprising sintering said soot.

10. The method of claim 9 further comprising the step of removing said starting member.

11. The method of claim 10 further comprising the steps of drawing said structure to reduce the cross-sectional area thereof and to collapse the hole remaining from removing said starting member to form a fiber having a solid cross-section.

12. The method of claim 11 wherein the sintering and drawing steps are accomplished during the same heating operation.

13. The method of claim 12 wherein said drawing is performed in a substantially oxygen atmosphere.

14. The method of claim 1 wherein said article is a light focusing fiber waveguide.

15. The method of claim 14 wherein said soot is fused silica that is at least initially doped.

16. The method of claim 15 further comprising the step of removing said cylindrical starting member.

17. The method of claim 16 further comprising the steps of
   heating the structure so formed to the drawing temperature of the materials thereof, and
   drawing the heated structure to reduce the cross-sectional area thereof and to collapse the hole resulting from removing said starting member to form a fiber having a solid cross-section.

18. The method of claim 17 further comprising the step of sintering said structure prior to the drawing step.

19. The method of claim 18 wherein said waveguide is transparent and the radially varying composition provides a radially varying index of refraction in accordance with the equation $$n_r = n_0 \text{ sech } \pi r/2F$$

where $n_0$ is the index of refraction at the center of said waveguide, $n_r$ is the index of refraction at any point at a distance $r$ from the center of the waveguide, and $F$ is the focal length of said waveguide.

20. A light focusing fiber waveguide formed by the method of claim 1.

* * * * *